US009148993B1

(12) United States Patent
Miller et al.

(10) Patent No.: US 9,148,993 B1
(45) Date of Patent: Oct. 6, 2015

(54) METHOD AND COMPOSITION FOR AGRICULTURAL POTASSIUM FERTIGATION

(71) Applicants: John C Miller, Fresno, CA (US); Deborah L Miller, Fresno, CA (US)

(72) Inventors: John C Miller, Fresno, CA (US); Deborah L Miller, Fresno, CA (US)

(*) Notice: Subject to any disclaimer, the term of this patent is extended or adjusted under 35 U.S.C. 154(b) by 0 days.

(21) Appl. No.: 14/564,510

(22) Filed: Dec. 9, 2014

Related U.S. Application Data

(63) Continuation-in-part of application No. 14/243,184, filed on Apr. 2, 2014, now Pat. No. 8,986,417, which is a continuation-in-part of application No. 13/385,736, filed on Mar. 5, 2012, now Pat. No. 8,721,758, which is a continuation-in-part of application No. 13/136,032, filed on Jul. 21, 2011, now Pat. No. 8,568,506, which is a continuation of application No. 12/283,448, filed on Sep. 12, 2008, now abandoned.

(60) Provisional application No. 61/056,151, filed on May 27, 2008.

(51) Int. Cl.
*C05D 1/00* (2006.01)
*A01C 23/00* (2006.01)
*A01C 21/00* (2006.01)
*A01G 1/00* (2006.01)
*A01G 7/00* (2006.01)
*A01G 25/02* (2006.01)
*A01C 23/04* (2006.01)

(52) U.S. Cl.
CPC ............. *A01C 21/007* (2013.01); *A01C 23/042* (2013.01); *A01G 1/001* (2013.01); *A01G 7/00* (2013.01); *A01G 25/02* (2013.01); *C05D 1/00* (2013.01)

(58) Field of Classification Search
CPC ............................... C05D 1/00; A01C 23/042
USPC ......................... 71/27, 64.1; 239/10
See application file for complete search history.

(56) References Cited

U.S. PATENT DOCUMENTS

| | | | | |
|---|---|---|---|---|
| 2,163,065 | A * | 6/1939 | Rosenstein | 71/1 |
| 4,969,947 | A * | 11/1990 | Moore | 71/28 |
| 8,568,506 | B1 * | 10/2013 | Miller et al. | 71/28 |
| 8,821,646 | B1 * | 9/2014 | Miller et al. | 134/22.12 |

* cited by examiner

*Primary Examiner* — Wayne Langel
(74) *Attorney, Agent, or Firm* — Joan I. Norek; The Law Office of Joan I. Norek

(57) ABSTRACT

An agricultural potassium-fertigation method for emitter-irrigation potassium fertigation feeds a potassium-nutrient feedstock comprised of potassium formate and water to an active emitter-irrigation system continuously, or substantially continuously, at low levels, during the entire time, or substantially the entire time, that irrigation water is sufficiently flowing through the irrigation system during a prolonged term.

13 Claims, 4 Drawing Sheets

METHOD AND COMPOSITION FOR AGRICULTURAL POTASSIUM FERTIGATION

This application is a continuation in part of application Ser. No. 14/243,184, filed on Apr. 2, 2014, which is a continuation in part of Ser. No. 13/385,736, filed Mar. 5, 2012, which is a continuation in part of application Ser. No. 13/136,032, filed on Jul. 21, 2011, which is a continuation in part of application Ser. No. 12/283,448, filed on Sep. 12, 2008, claiming the domestic priority benefit of application No. 61/056,151 filed on May 27, 2008, inventors Miller et al.

BACKGROUND OF THE INVENTION

The present invention relates to methods for fertilization by adding fertilizer nutrients to agricultural irrigation systems.

The agriculture industry adds fertilizers to the plant environs, such as the soil, to enhance crop growth and subsequent yields. Commercial fertilizers are usually selected of a variety of formulations depending on the crop and its nutrient requirements.

Fertilizers generally are classified according to their NPK content. NPK is common terminology used in the fertilizer industry and stands for: (1) N—the amount of nitrogen in the formulation as N; (2) P—the amount of phosphorus in the formulation as $P_2O_5$; and (3) K—the amount of potassium in the formulation as $K_2O$. Nitrogen, phosphorus and potassium are the basic plant nutrients or macronutrients that are taken up and utilized by the growing crops, and they are commonly provided or augmented by the addition of fertilizers (NPK fertilizers).

A fertilizer, as that term is used herein and as generally understood, refers to the nutrient-containing materials used to deliver fertilizer nutrients to a crop. Conventional fertilizers typically will contain materials that are extraneous to the crop's nutrient-uptake and soil condition ("yield-extraneous constituents") but which, for practical and/or other reasons, are necessary to the delivery of the nutrients. The process of delivering fertilizer nutrients to crops is referred to as fertilization.

The fertilization method of adding fertilizers to the water being used to irrigate the crops is called "fertigation", reflecting this combination of irrigation and fertilization. Fertigation reduces equipment, fuel and labor expended in the addition of fertilizers in comparison to mechanical delivery of fertilizers to the crop, and thus fertigation achieves a significant overall cost savings.

To conserve water, which is decreasing in availability and increasing in cost, current conventional technology includes micro-irrigation systems that deliver precise amounts of water directly to the soil holding the root system of the plant that is being grown. In the past twenty to thirty years, a large percentage of crop producers in the western and southwestern United States have converted from flood and sprinkler irrigation systems to micro-irrigation technology. Micro-irrigation systems contain devices called emitters, micro-sprinklers or other such devices that provide the precise amounts of water directly to the desired soil site, namely the soil holding the roots of the plant or crop being irrigated.

Micro-irrigation systems are sensitive to water quality and the inclusion of fertilizers and other additives stemming from the refinement of their micro components. These emitters, micro-sprinklers or other micro devices have very tiny orifices and/or a long tortuous narrow passageway that provide the requisite pressure for delivery of precise amounts of water in a uniform manner to each plant in the crop being irrigated so long as deposits do not build up inside them. Deposits from any source foul or plug these micro components. The smallest particle or foreign material can cause fouling of these devices. Water quality and the inclusion of fertilizers can, and frequently does, cause severe plugging problems. The problems arise from a number of factors: (1) the irrigation water is typically obtained from wells, reservoirs, canals, lakes, or rivers which contain various amounts of dissolved minerals; and (2) fertilizers can form insoluble salts and/or cause particulate formation when added to the water. Macro-irrigation systems (macro-sprinkler irrigation systems) mainly tolerate these conditions, while micro-irrigation systems are extremely intolerant.

In more detail, the addition of conventional fertilizer formulations to irrigation water normally increases the loading of inorganic salts over that already in the water. When the loading, or the combined loading, is too high, the solubilities of at least some of the naturally-occurring irrigation-water minerals and/or added compounds are exceeded and particulate formation increases dramatically. When particulates form, significant deposits begin to build up throughout the irrigation system. The end result for emitters or micro-sprinklers is plugging.

Plugging results in uneven distribution of water and nutrients to the crop being irrigated, and in some cases, the complete shut-down of the micro-irrigation system. Problem-free use of additives such as fertilizers in micro-irrigation systems is normally seen only in irrigation systems that use relatively pure water sources.

The conventional agricultural practice is to make intermittent or periodic applications of fertilizers. Such intermittent additions might be a single addition, or a plurality of additions, of large amounts (high concentrations) of fertilizer during a brief time interval each growing season or crop cycle. (The number of applications per growing season or crop cycle usually depends on the crop and/or the type of fertilizer being added.) When the fertilizer-delivery method is fertigation, fertilizers are typically slug fed into the irrigation system as quickly as possible to minimize the labor requirements and ease material handling. Slug feeding of a block (portion of a field) normally entails feeding the large amounts (high concentrations) of fertilizer to the irrigation water over a six to seven hour period during irrigation, and then, after the fertilizer feed is shut off, continuing the irrigation of that block for an additional two to three hours to rinse out all of the fertilizer that is contained inside the irrigation system, insuring that all of the fertilizer intended for the block is in fact delivered to the block.

The cost of commercial fertilizer formulations is, however, itself significant, and commercially viable fertilizer formulations (formulations sufficiently inexpensive for bulk agricultural use) typically include, as mentioned above, yield-extraneous constituents which do not contribute to plant nutrition or soil condition, and can even be undesirable components. Further, the bulk weight of commercial fertilizer formulations typically is water which increases the shipping costs. The water of a fertilizer formulation is analogous to, or at least approaches being, a yield-extraneous constituent because its contribution to the water requirements of a crop normally is negligible, particularly in comparison to its adverse impact on shipping, storage and handling but since water is normally required for an unimpeded container-to-irrigation-system fertilizer addition it is analogous to, but still not considered herein, an "essential yield-extraneous constituent material".

The terms "micro-irrigation" and "macro-irrigation" as used herein refer respectively to (1) micro-sprinklers, drip, and subsurface drip systems and (2) sprinkler systems without micro components which are primarily overhead sprinklers. The terms "overhead sprinkler" and "overhead sprinklers" as used herein refer to irrigation systems in which the irrigation water is emitted or sprayed from sprinkler heads, nozzles or other irrigation devices disposed at a position elevated from ground level, that normally (but not necessarily) are engaged directly above the crop being irrigated. Overhead sprinkler irrigation systems are normally macro-irrigation systems because micro-irrigation normally depend on a close proximity between the emitters and soil immediate the crop while overhead sprinklers are normally spaced apart from the soil immediate the crop. Such micro- and macro-irrigation systems are collectively referred to herein as "emitter-irrigation" systems because they each emit or eject sequential small quantities of irrigation water from irrigation lines or tubes directed more or less towards the crop being irrigated.

SUMMARY OF THE INVENTION

The present invention provides a method for emitter-irrigation potassium fertigation wherein a potassium-nutrient feedstock comprised of potassium formate and water is charged to an active emitter-irrigation system continuously, or substantially continuously, at low levels, during the entire time, or substantially the entire time, that irrigation water is sufficiently flowing through the irrigation system during a prolonged term ("prolonged-termed continuous charge" or prolonged-termed continuous fertigation") wherein the potassium-nutrient feedstock has a high potassium-nutrient content, has a high organic carbon content, has a minimal amount of water, has no essential yield-extraneous constituent such as sulfate, has no essential yield-adverse constituent such as degradable thiosulfate, phosphate or chloride and its minimal water content drastically reduces shipping, storage and handling costs.

DETAILED DESCRIPTION OF THE INVENTION

Prolonged Term

Figure 1:
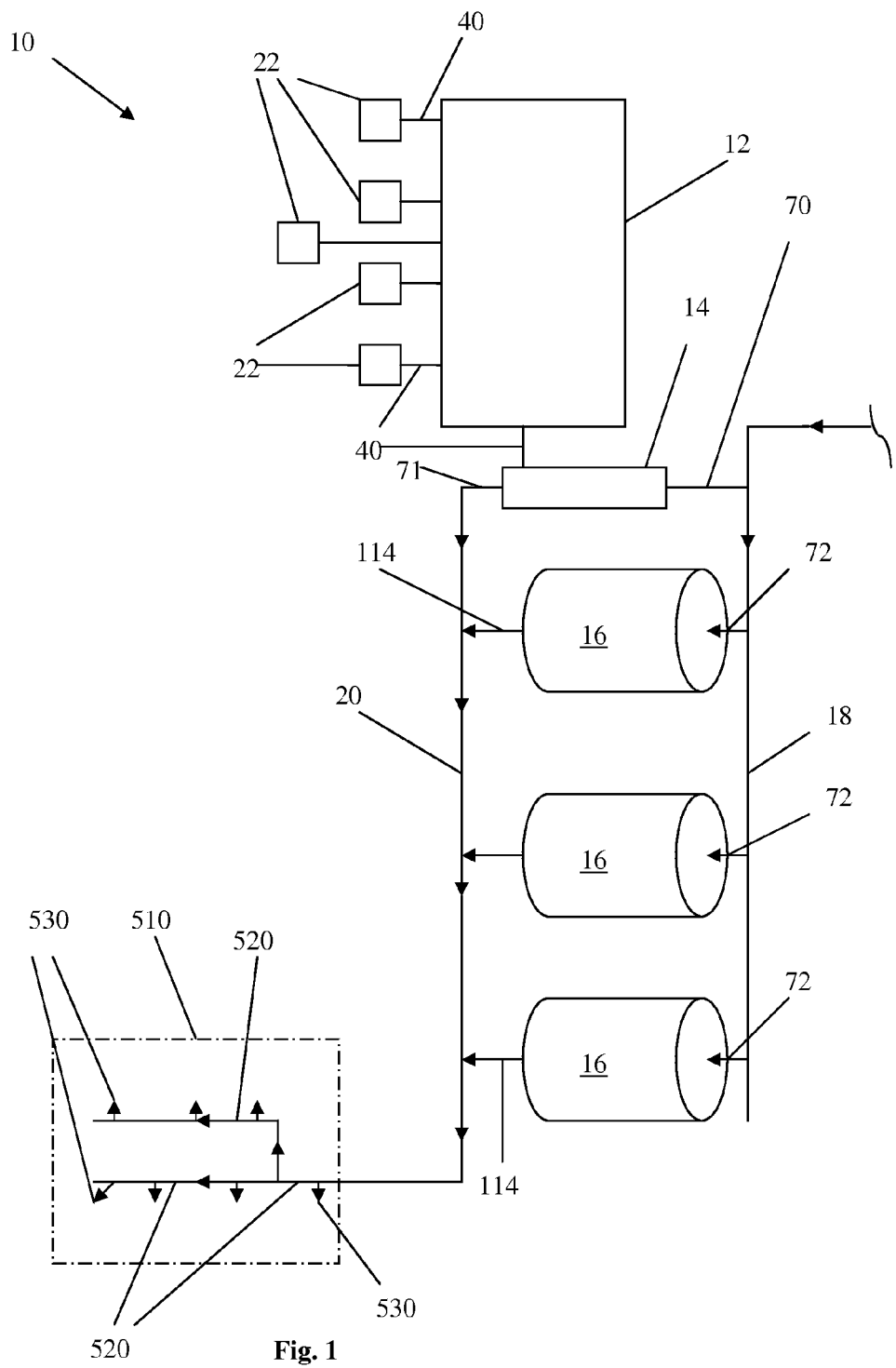
FIG. 1 is an at least partially diagrammatic view of a system used in certain embodiments of the present invention.

The prolonged-term charge of the potassium-nutrient feedstock to the irrigation system continuously or substantially continuously at low levels of the present invention provides uniform, consistent levels of available potassium during a crop cycle until it is no longer desired as fruiting approaches, in comparison to conventional fertigation techniques.

By prolonged term is meant herein a time period that extends from an interval (term) during a crop cycle comprising at least multiple consecutive irrigations, and preferably comprising at least a three month time period or a time period comprising fifty percent of the respective crop cycle, and more preferably at least a four month time period or a time period comprising seventy-five percent of the respective crop cycle, or ninety percent of the respective crop cycle or even an entire crop cycle. (A crop cycle is a crop's growing period, from embryonic to maturity or harvest, during which the crop is irrigated.) Since potassium promotes fruiting (fruit development), that is, the ripening of a crop plant's fruit, when such ripening is at, or approaches, optimal, potassium fertilization normally is ceased to avoid fruit development beyond the point that provides the crop's best agronomic output (agronomic payload or payout), such as fruit, vegetable, nut and the like sections of the plant, prior to harvest.

Prolonged-Termed Continuous:

The charge of the potassium-nutrient feedstock to the irrigation water is prolonged-termed continuous. By a prolonged-termed (or prolonged-term) continuous charge of potassium-nutrient feedstock (or continuously charging potassium-nutrient feedstock over a prolonged term) is meant herein that the charge is continuous when the irrigation system is active during a given prolonged term. In more detail, when an irrigation system is idled, water usually drains out and the system becomes mainly filled with air. Upon reactivation, there is a time delay between the start of water flowing into the irrigation system and the point of time at which the system reaches its full or normal operating pressure (from about 10 to 150 psi depending on the system). The continuous charge of potassium-nutrient feedstock normally ceases when the shutdown (the idling) of the irrigation system initiates (and the water pressure falls below full or normal operating pressure for the given system) and does not recommence until at least a preponderance of the irrigation system is refilled with water, at which point the system is typically approaching, but might not yet be at, its full or normal operating pressure. In other words, by a continuous charge of potassium-nutrient feedstock on a given irrigation day is meant herein that the charge is continuous when irrigation water is flowing at least at ninety percent of full or normal operating pressure.

The Potassium-Nutrient Feedstock

The method and/or system of the present invention, namely the method and/or system for fertigation by charging a potassium-nutrient feedstock comprised of potassium formate and water to the irrigation system, is drastically advantageous because the feedstock has a high potassium-nutrient content, has a high organic carbon content, has a minimal amount of water, has no essential yield-extraneous constituent such as sulfate, has no yield-adverse constituent such as degradable thiosulfate, phosphate or chloride and its minimal water content drastically reduces shipping, storage and handling costs. It has no cations or anions (such as phosphate as mentioned above) that increase the deposit-forming load of the irrigation water to which it is fed. Such anions or cations, and other adverse constituents such as degradable thiosulfate, are typically present in commercial fertilizers because they are needed for the delivery of the nutrient or for other reasons tied to the respected formulation; in other words, they are essential yield-adverse constituents with respect to those formulations.

At the preferred concentration levels of potassium formate of from 50 to 75 wt. percent, the feedstock ranges from a 0-0-28 NPK fertilizer to a 0-0-42 NPK fertilizer. In more preferred embodiments, the concentration level of potassium formate in the feedstock is from 65 to 75 wt. percent, and therefore the feedstock ranges from about a 0-0-36 NPK fertilizer to a 0-0-42 NPK fertilizer.

Further, in preferred embodiments, the potassium-nutrient feedstock is charged to the irrigation system at levels sufficient to provide a concentration of from 1 to 200 ppm of potassium as K2O in said treated irrigation water, and more preferably from 5 to 100 ppm of potassium as K2O in said treated irrigation water.

In contrast, the most basic (simple) sources of potassium used in conventional agricultural fertigation are potassium sulfate and potassium thiosulfate. Potassium sulfate is soluble only up to 8% potassium as K2O (a 0-0-8 NPK fertilizer), requiring huge costs for (a) the shipment and storage of this dilute fertilizer and (b) the time and labor required to slug-feed such a dilute material to an irrigation system. Potassium thiosulfate (a 0-0-25 NPK fertilizer) has a higher solubility than potassium sulfate (but still far lower than the present invention's more preferred 0-0-36 NPK to 0-0-42 NPK feedstock) but it is expensive and, since the sulfur of thiosulfate is not in its highest oxidation state, it is at risk of decomposition and precipitation, which leads to fouling of the irrigation system and impaired irrigation. (No oxidants, such as chlorine, can be used in the irrigation system at or about the same time as potassium thiosulfate.) Potassium nitrate, another potassium source, is very soluble but (a) its distribution is restricted or prohibited by laws and/or regulations because of security risks associated with its nitrate content and (b) it is prohibitively expensive. Potassium phosphate, another highly soluble potassium source, is also much too expensive for conventional fertigation practices and the phosphate, an essential yield-adverse constituent with respect to this fertilizer, can cause precipitation and fouling problems.

The present invention does not exclude sequential and/or concomitant addition of other materials if desired, including but not limited to one or more other fertilizers and the like. In preferred embodiments, particularly with respect to micro-irrigation systems, concomitant addition of other materials is limited to materials having molecular weights that do not exceed 1,000 as charged or as developed within the irrigation system.

Figure 2:
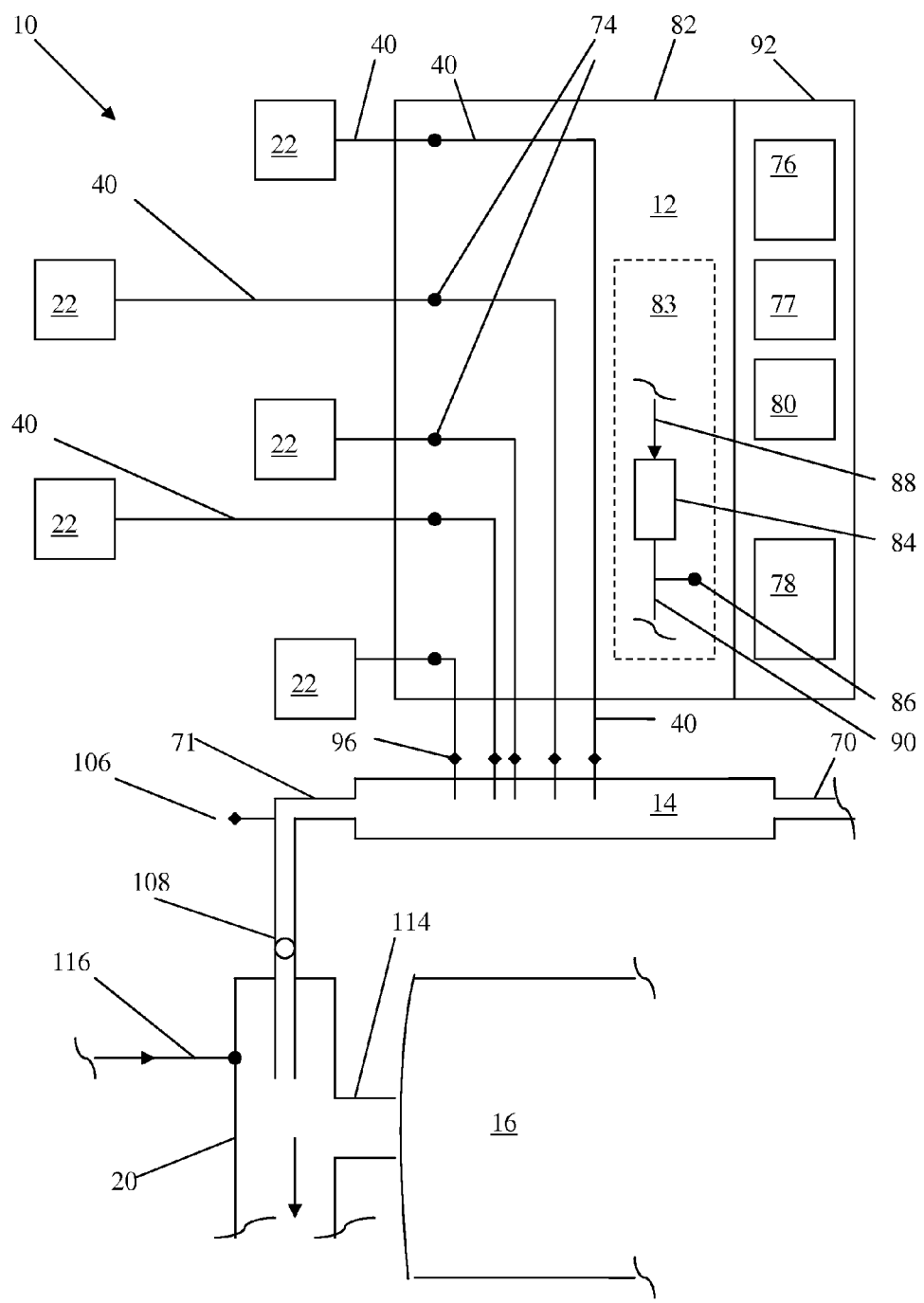
FIG. 2 is an at least partially diagrammatic view of a section of the system of FIG. 1.
Figure 3:
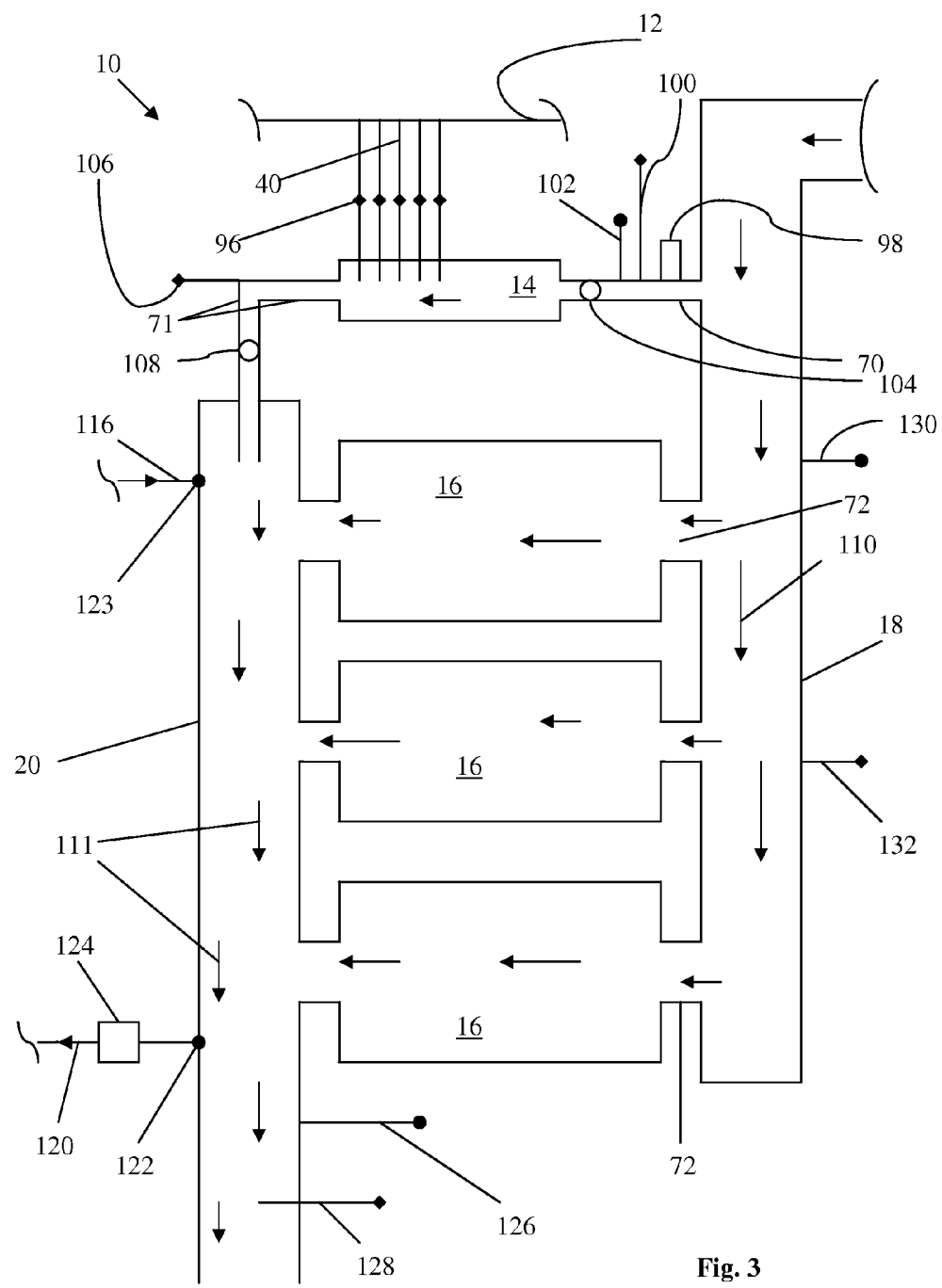
FIG. 3 is an at least partially diagrammatic view of a section of the system of FIG. 1.

The potassium-nutrient feedstock is charged to an irrigation system by feeding it to the irrigation water either (1) flowing through a mixing chamber that discharges to a main line of an irrigation system downstream of any irrigation-system filters and upstream of the delivery points of the irrigation system or (2) flowing through a main line of an irrigation system (that is, directly charging to a main line of an irrigation system) downstream of any irrigation-system filters and upstream of the delivery points of the irrigation system, as illustrated in FIG. 1 to FIG. 3 and discussed below.

The method of the present invention in certain preferred embodiments employs an automated feed system which feeds or charges the material to the mixing chamber or main line at a pre-selected or pre-determined rate, which is discussed below. Such an automated feed system therefore charges the potassium-nutrient feedstock at a pre-selected or pre-determined rate. The automatic feeding of the potassium-nutrient feedstock at a pre-selected or pre-determined rate is particularly important when it is desirable to feed the feedstock at a rate relative to the irrigation-water flow rate, so as to automatically provide and maintain a pre-selected or pre-determined concentration of the feedstock in the irrigation water throughout the fertigation period, including when the irrigation water flow rate varies from one set to the next. Such an automated feed system would be inactive or idle when there is no irrigation water flow in the irrigation line served by the automated feed system. That automated feed system may be, and in certain embodiments is preferably, automatically activated or triggered upon the commencement of water flow in the irrigation line, and may be, and in certain embodiments is preferably, automatically deactivated or halted when the flow of irrigation water ceases.

The System of FIG. 1 to FIG. 3

Referring to FIG. 1 and, to the extent components are shown in FIG. 2 and FIG. 3, to FIG. 2 and FIG. 3 also, there is shown a system of the present invention designated by the general reference numeral 10. An agricultural irrigation system distributes irrigation water typically from a water source whether it be a well, surface water (such as water in a canal, reservoir, stream or the like), reclaimed or recycled water. A stream of irrigation water is pumped into a main line (irrigation system main line) and then is filtered. The system 10, as shown in FIG. 1, FIG. 2 and FIG. 3, is an embodiment of an extended system used in certain embodiments of the present invention because system 10 includes such filters and a segment of such a main line from a point upstream of the filters to a point downstream of the filters, and the addition of potassium-nutrient feedstock occurs between these two points.

As described below, a segment of a stream of irrigation water that is running between the irrigation-water source and the irrigation line(s) in the field(s) is within the system 10 wherein the irrigation water is first filtered and then treated with the feedstock of the present invention. The system 10 includes a control unit 12, optionally a plurality of filters, which here are shown as sand-media filters 16, an irrigation-water line, which here is shown as a pre-filter (and somewhat higher pressure) segment of an irrigation-water main line, or pre-filter main line 18, which feeds irrigation water (identified and discussed below) through each of the sand-media filters 16, and also through a mixing chamber 14, to a post-filter (and somewhat lower pressure) segment of the irrigation-water main line, or post-filter main line 20. (The post-filter main line 20 is a transport pipe that carries irrigation water to one or more agricultural fields, such as the agricultural field 510 shown in phantom, and obviously not to scale, in FIG. 1. One or more secondary transport pipes service a typical agricultural field, such as transport pipes 520 shown in FIG. 1. Devices for delivering the irrigation water at points in the field, shown as devices 530 in FIG. 1, can be overhead sprinklers or micro-devices (such as emitters or micro-sprinklers.) The potassium-nutrient feedstock is stored in one of the storage containers 22 which may be conveniently disposed nearby the control unit 12 as shown. As shown, such storage containers or tanks 22 include one for each of the materials to be added, including but not limited to extraneous fertilizers, are shown. (The storage tanks 22 are shown staggered for simplicity in showing each of the feed lines 40.)

In other words, the method of the present invention requires at least one storage facility, namely one for the potassium formate solution. The method of the present invention does not exclude the feeding of other materials as described in more detail below.

There is a feed line 40 between each of the raw-material tanks 22 and the mixing chamber 14. These feed lines 40 run through the interior of the control unit 12 (not shown in FIG. 1) to the mixing chamber 14. (Only one of such feed lines 40 is shown running to the mixing chamber 14 for simplicity). For each of the materials, and feed lines 40, there is an injection valve 96 along the feed line 40 just ahead of the point at which the feed line 40 enters the mixing chamber 14, none of which is shown in FIG. 1 for simplicity, and all of which are shown in FIG. 2 and FIG. 3.

Irrigation water flows to and through each of the sand-media filters 16 through filter feed lines 72. A stream of the irrigation water also flows from the pre-filter main line 18 to the mixing chamber 14 through a mixing-chamber feed line 70, except when the mixing-chamber feed line 70 is closed off. The water flows from the mixing chamber 14 and from each of the sand-media filters 16 discharge to the post-filter main line 20.

Referring now in particular to FIG. 2 (where the storage tanks 22 are again shown staggered for simplicity in showing each of the feed lines 40), each of the feed lines 40 is equipped with a feed pump 74. Each of these feed pumps 74 is controlled by a flow controller 76 and a master controller 78. Each of these feed pumps 74 is in electrical communication with a flow controller 76 and the master controller 78 (the electrical connections are not shown) and injects or pumps in its respective material to its respective feed line 40 at the rate determined by the flow controller 76 and the master controller 78.

The control unit 12 is divided into two chambers, one of which is a lower chamber 82 which houses the feed pumps 74 and a portion of the feed lines 40 downstream of the respective tanks 22 and upstream of the mixing chamber 14. The second chamber of the control unit 12 is an upper chamber 92 which houses the flow controller 76, the master controller 78 and an optional temperature controller 77.

Along each of the feed lines 40 downstream of the respective feed pumps 74 and upstream of the mixing chamber 14 is, as mentioned above, an injection valve 96, each of which is preferably equipped with a backflow preventer (not shown). Along the mixing-chamber feed line 70 are, in the order of from upstream (closest to the pre-filter main line 18) to downstream (closest to the mixing chamber 14) an optional booster pump 98, a mixing-chamber feed-line flow meter 100, a mixing-chamber feed-line flow sensor 102 and a mixing-chamber feed-line shut-off valve 104. The line opposite the mixing-chamber feed line 70 is a mixing-chamber discharge line 71 that is open to the post-filter main line 20. Along the mixing-chamber discharge line 71, in the order of from upstream (closest to the mixing chamber 14) to downstream (closest to the post-filter main line 20), are an optional mixing-chamber discharge-line thermocouple 106 and a mixing-chamber discharge-line shut-off valve 108.

The pre-filter main line 18 is open to the mixing chamber 14 through the mixing-chamber feed line 70, and is open to each of the sand-media filters 16 through filter feed lines 72 or openings. Untreated irrigation water, that is, irrigation water that is not yet treated by the system of the present invention, which is shown by flow arrows and is designated as untreated irrigation water 110 in FIG. 3, flows through the pre-filter main line 18 and discharges to the mixing chamber 14 and the sand-media filters 16 through these respective lines.

As noted above, the mixing-chamber discharge line 71 is open to, and discharges to, the post-filter main line 20, which is best seen in FIG. 3. In addition, each of the sand-media filters 16 is open to, and discharges to, the post-filter main line 20 via filter discharge lines 114 or openings. The untreated irrigation water 110 of the pre-filter main line 18 thus flows to the post-filter main line 20 and therein receives the discharge from the mixing-chamber discharge line 71, becoming irrigation water that carries or has been treated with the potassium-nutrient feedstock of the present invention. Such treated irrigation water is shown by flow arrows and is designated as treated irrigation water 111 in FIG. 3 and elsewhere herein.

Along the post-filter main line 20, in the order of from upstream (closest to the mixing-chamber discharge line 71) to downstream (farthest from the mixing-chamber discharge line 71), are a post-filter main-line pressure gauge 126 and a post-filter main-line flow sensor 128.

Along the pre-filter main line 18, in the order of from upstream (closest to the mixing-chamber feed line 70) to downstream (farthest from the mixing-chamber feed line 70), are a pre-filter main-line pressure sensor 130 and a pre-filter main-line pressure gauge 132.

The storage tanks 22 can vary in size depending on the size and nutrient needs of the irrigation site they serve. Typical storage container sizes are between 300 and 6,500 gallons. The electrical connections between the feed pumps 74 along the feed lines 40 and the controlling flow controller 76 and master controller 78 each consist separately of an on/off power control (not shown) and a feedback loop (not shown) which controls the output of the respective feed pumps 74, and the construction and operation of such electrical connections are well within the skill of an ordinary person skilled in the art. The upper chamber 92 of the control unit 12, which houses the electrical controls, namely the flow controller 76, the temperature controller 77 and the master controller 78, is isolated from the lower chamber 82 (which houses the feed pumps 74) to avoid, or at least inhibit, corrosion of the electrical components of the electrical controls. The control unit 12 generally is preferably constructed of heavy gauge steel that is anodized to inhibit corrosion. It preferably is secured with a high security lock system (not shown) and is preferably anchored to the ground with several six foot deep spikes (not shown) to prevent tampering and/or theft of the equipment held within the control unit 12.

The flow controller 76 within the control unit 12, which is one of the controls over the feed pumps 74, is also in electrical connection (not shown) with the post-filter main-line flow sensor 128 along the post-filter main line 20. (The construction and operation of these electrical connections are well within the skill of an ordinary person skilled in the art.) The flow controller 76 proportionately varies the input of the materials through the respective feed pumps 74 based on the flow rate of the treated irrigation water 111 which is read by the post-filter main-line flow sensor 128 downstream of (beyond) the sand-media filters 16.

The temperature controller 77 within the control unit 12 is in electrical connection (not shown) with the mixing-chamber discharge-line thermocouple 106 along the mixing-chamber discharge-line 71. (The construction and operation of these electrical connections are well within the skill of an ordinary person skilled in the art.) The materials from the storage tanks 22 are routed through the respective feed lines 40 and charged to the mixing chamber 14. The potassium-nutrient feedstock is intermixed with any other material being concomitantly fed and with a stream of untreated irrigation water 110 being fed into the mixing chamber 14 through the mixing-chamber feed line 70. The treated irrigation water may be monitored by the mixing-chamber discharge-line thermocouple 106 as it exits the mixing chamber 14. If that temperature is undesirably high, for instance 40° C. or higher (higher than 39° C.), the temperature controller 77 sends a feedback signal to the master controller 78 and the master controller 78 shuts off the feed pumps 74 until a safe temperature is seen at the mixing-chamber discharge-line thermocouple 106, and this off/on sequence is repeated until a safe temperature, as seen at the mixing-chamber discharge-line thermocouple 106, is maintained.

The master controller 78 automatically turns the system 10 on. The master controller 78 is electrically connected (not shown) both to the pre-filter main-line pressure sensor 130 and to the mixing-chamber feed-line flow sensor 102. (The construction and operation of these electrical connections are well within the skill of an ordinary person skilled in the art.) When a minimum pressure (typically 15 psi) is seen at the pre-filter main-line pressure sensor 130 and a minimum flow of water (typically twenty gallons per minute) is seen at the mixing-chamber feed-line flow sensor 102, the master controller 78 actuates the feed pumps 74 and injection valves 96 and any other component of the system 10 which facilitate the treatment of the untreated irrigation water that are then in an inactive state. Upon such actuation, materials start feeding to, and mixing in, the mixing chamber 14. (The master controller 78, pre-filter main-line pressure sensor 130 and mixing-chamber feed-line flow sensor 102 are typically always in an active state.). The master controller 78 will not allow such actuation unless both minimums are met. Once the feed pumps 74 and injection valves 96 are actuated, the master controller 78, for safety reasons and preferably, will automatically shut down the feed pumps 74 and injection valves 96 when either of the values seen at the pre-filter main-line pressure sensor 130 and the mixing-chamber feed-line flow sensor 102 falls below its respective minimum, and automatically restart the feed pumps 74 and injection valves 96 when both of the values seen at the pre-filter main-line pressure sensor 130 and the mixing-chamber feed-line flow sensor 102 meet or exceed its respective minimum. In other words, once the flow of untreated irrigation water 110 to the fields begins, it starts flowing (a) through the pre-filter main line 18, (b) to and through the sand-media filters 16, (c) discharging to, and flowing through the post-filter main line 20, and (d) from there to the irrigation lines in the field(s) (not shown), the master controller 78 will actuate the feed pumps 74 and injection valves 96 if the irrigation water is at the normal or expected pressure, flow and flow rate. Note that generally the flow of irrigation will occur as described above regardless of whether the master controller 78 has actuated the feed pumps 74 and injection valves 96 or has shut down the feed pumps 74 and injection valves 96 after initial actuation because that flow sequence and infrastructure are the conventional elements of the irrigation system.

Based on the potassium-nutrient-application profile (the amount of potassium nutrient that is required for a given time period of the given crop cycle), the master controller 78 automatically determines and sets the correct synchronizations of the feed pumps 74 to provide the desired potassium-nutrient feedstock.

As mentioned elsewhere herein, the master controller 78 controls the temperature within the mixing chamber 14, preventing the temperature from straying out of (normally exceeding) the desired range, by shutting off the feed pumps 74 until that temperature drops to, and can be maintained within, the desired range.

When filter(s) are disposed within the path of the irrigation water flowing through the system of the present invention (which is standard but not universal for commercial irrigation systems), such as the sand-media filters 16 shown within the path of the irrigation water between the pre-filter main line 18 and post-filter main line 20 (except the small stream of irrigation water that is routed through the mixing chamber 14), there is normally a small but significant water-flow pressure drop across the filters, such as sand-media filters 16. A flow rate of at least 20 gallons per minute or more of untreated irrigation water 110 through the mixing chamber 14 is preferred, and the optional booster pump 98 is preferably included to provide such flow rate if the pressure drop across the sand-media filters 16 would result in a lower flow rate through the mixing chamber 14 or if a higher flow rate is required to maintain a mixing chamber temperature below 40 degrees C.

As noted elsewhere, disposed along the mixing-chamber feed line 70 are the booster pump 98, the mixing-chamber feed-line flow meter 100, the mixing-chamber feed-line flow sensor 102 and the mixing-chamber feed-line shut-off valve 104. The mixing-chamber feed-line flow meter 100 determines the actual flow rate of untreated irrigation water 110 to, and therefore through, the mixing chamber 14. The mixing-chamber feed-line flow sensor 102 determines if a flow of untreated irrigation water 110 is occurring to, and therefore through, the mixing chamber 14. The flow of materials to the mixing chamber 14 will not be permitted unless a flow of untreated irrigation water 110 is occurring through the mixing chamber 14. There of course are electrical connections (not shown) between the mixing-chamber feed-line flow meter 100 and the master controller 78, and between the mixing-chamber feed-line flow sensor 102 and the master controller 78.

The mixing-chamber feed-line shut-off valve 104 is not generally an active element in the operation of the present system, but instead it is an optional, and typically manual, expedient. The mixing-chamber feed-line shut-off valve 104 and the mixing-chamber discharge-line shut-off valve 108 (which likewise is an optional, and typically manual, expedient) can be conveniently used together to isolate the mixing chamber 14 from the flows of irrigation water for maintenance or repair purposes, if ever needed. When the mixing-chamber feed-line shut-off valve 104 and the mixing-chamber discharge-line shut-off valve 108 are open (or in embodiments when they are not present), the small stream of untreated irrigation water 110 flows through the mixing chamber 14 whenever the irrigation water is flowing to the fields (not shown), regardless of whether or not any materials are being fed to the mixing chamber 14.

Along the mixing-chamber discharge line 71, downstream of the mixing chamber 14, is the mixing-chamber discharge-line thermocouple 106 which senses the temperature of the potassium-nutrient feedstock and irrigation water mixture as it exits the mixing chamber 14, and sends that data signal (temperature reading) to the master controller 78 for its processing and control of the temperature within the mixing chamber 14 as discussed elsewhere herein. There of course are electrical connections (not shown) between the mixing-chamber discharge-line thermocouple 106 and the master controller 78.

The dispositions and functions of the post-filter main-line pressure gauge 126, pre-filter main-line pressure sensor 130 and the post-filter main-line flow sensor 128 are discussed elsewhere.

The sand-media filters 16 are typically large, for instance 300 gallon, stainless steel filters. Such type of filters is routinely used by growers to remove debris from untreated irrigation water before it enters the irrigation system in the fields. The sand-media filters 16 of the system 10 of the present invention generally and preferably would be filters that are already in place at the given irrigation-system site. As the untreated irrigation water 110 passes through the sand of the sand-media filters 16, the flow of the untreated irrigation water 110 is restricted and that flow restriction causes a small but significant pressure drop across the sand-media filters 16. Such pressure drop is typically in the range of from 5 to 15 psi (but can be higher as debris builds up in the filter), and is the reason that there is a pressure differential between the pre-filter main line 18 and the post-filter main line 20. This pressure drop facilitates a large (fast) flow of untreated irrigation water 110 through the mixing chamber 14 that is needed to temper or mitigate any temperature increase within the mixing chamber 14. The previously-described optional booster pump 98 is available to create and/or maintain the requisite water flow through the mixing chamber 14, and it is a highly recommended option for irrigation systems that do not have a large enough pressure drop across the filters 16 to provide the requisite cooling by the untreated irrigation water 110 when the potassium-nutrient feedstock is charged to the mixing chamber 14. In other words, the flow of untreated irrigation water 110 water through the mixing chamber 14 is large (fast) compared to the feed rate (injection rate) of the materials into the mixing chamber 14

In contrast, the system shown in FIG. 4 and described below charges the potassium-nutrient feedstock directly into the irrigation main line.

Master controller 78 includes various electronic components that are designed to monitor various electrical signals from the sensing devices. Depending on what signals are input, the master controller 78 turns on the various components of the system once the irrigation system is fully operational and in a mode to insure the proper feed of all the materials in the correct proportions, under controlled conditions, to safely add the potassium-nutrient feedstock to the irrigation system. Numerous configurations of electric components could be designed to achieve this control. As shown, the master controller 78 consists of various relays, timing devices and power supplies that take the various signals from the sensing equipment and turn on and off the various control systems to safely control the chemical feed pumps 74. (A master controller could of course send the sensing and control data, via wireless communication networks, to an operator stationed in a distant office.) If any incorrect or out-of-range signal is received by the master controller 78 the circuitry inside the master controller 78 responds and sends the appropriate feedback signal to the appropriate device or system to immediately correct the out-of-range condition, change the flow rate of the material feed pumps 74 or totally shut off the material feed pumps 74.

The system 10 can determine and adjust the pH of the treated irrigation water 111, particularly as illustrated in FIG. 2 and FIG. 3 in which the lower chamber 82 as shown also houses a pH monitoring system 83 (shown in phantom lines in FIG. 2) which, as shown, is comprised of a pH monitoring-system pump 84, a pH sensor 86, a pH feed line 88 and a pH return line 90, and in which the upper chamber 92 includes a pH controller 80. Also along the post-filter main line 20, in the order of from upstream (closest to the mixing-chamber discharge line 71) to downstream (farthest from the mixing-chamber discharge line 71), are the terminal end 116 of the pH return line 90, the starting end 120 of the pH feed line 88 (along which is a pH line shut-off valve 122 and a solenoid 124). The pH control additives, for instance an acid such as sulfuric acid or phosphoric acid are preferably stored as concentrated solutions in a storage container(s) served by a feed pump(s) and a feed line(s) as discussed above and illustrated for the materials.

When this optional feature is present, the pH controller 80, which is in electrical connection (not shown) with the flow controller 76, might override the flow controller 76 at times for the specific control of the feed pump(s) (such as one of the feed pumps 74 shown) along the feed line (such as one of the feed lines 40 shown) of the sulfuric acid material (or other mineral acid material or even one or more separate pH-control additives) tank (such as one of the tanks 22 shown) to give the target pH. (The construction and operation of these electrical connections are well within the skill of an ordinary person skilled in the art.)

The pH controller 80 is electrically connected (not shown) to the pH monitoring system 83. (The construction and operation of these electrical connections are well within the skill of an ordinary person skilled in the art.) The pH controller 80 in conjunction with the pH monitoring system 83 controls the pH of the treated irrigation water 111 as it leaves the system 10. The pH of the treated irrigation water 111 is monitored by diverting a very small stream of treated irrigation water 111 through the starting end 120 of the pH feed line 88 (see FIG. 3) to the pH sensor 86 (see FIG. 2) whereat the pH of that small stream is determined. Based on the pH of the treated irrigation water 111 and based on the feed being produced in the mixing chamber 14, the pH controller 80 adjusts (increases or decreases) the feed of one or more pH adjustment additives to achieve a target treated irrigation water pH. (Under the present invention, a base is optionally available for increasing the pH if needed to achieve a constant target pH, although in practice a pH increase would normally not be required. Further discussion herein of pH adjustment presumes that decreasing the pH is the only adjustment required.) The target treated irrigation water pH is typically a pH of about 6.5, or between 6.5 and 7, and usually is lower than the pH of the untreated irrigation water, because untreated irrigation water is usually alkaline.

The solenoid 124 allows the small stream of the treated irrigation water 111 to be diverted to the pH monitoring system 83 via the pH feed line 88. The master controller 78 will normally and preferably activate the solenoid 124 when it actuates the feed pumps 74 and injection valves 96. The electrical connections between the solenoid 124 and the master controller 78 are not shown.

As mentioned above, a small stream of treated irrigation water 111 is diverted from the post-filter main line 20 to the pH monitoring system 83 through the pH feed line 88 and is returned to the post-filter main line 20 (preferably, as shown, upstream of its diversion point) through the pH return line 90. Along the starting end 116 of the pH feed line 88 is a pH feed-line shut-off valve 122. Along the terminal end 120 of the pH return line 90 is a pH return-line shut-off valve 123. The pH feed-line shut-off valve 122 and the pH return-line shut-off valve 123 are not normally active elements of the system 10 but instead are optional, and typically manual, expedients which can be conveniently used together to isolate the pH monitoring system 83 from the flows of irrigation water for maintenance or repair purposes, if ever needed, without discontinuing the irrigation water flow through the remainder of the system 10.

The small stream of treated irrigation water 111 that is diverted from the post-filter main line 20 at the starting end 120 of the pH feed line 88 feeds into the pH monitoring system 83 through the pH feed line 88. (The starting end 120 of the pH feed line 88 as seen in FIG. 3 and the pH feed line 88 as seen in FIG. 2 are opposite ends of a single flow line.) The pH of that small stream is read by the pH sensor 86 of the pH monitoring system 83. Electrical connections between the pH sensor 86 and the pH monitoring system 83 exist but are not shown. The pH monitoring-system pump 84 pumps the small stream through the pH monitoring system 83, and the pH monitoring-system pump 84 is controlled by the master controller 78 (electrical connections between these elements are not shown.)

To summarize, the pH monitoring system 83 includes the pH monitoring-system pump 84 which pumps treated irrigation water 111 from the post-filter main line 20 through the pH feed line 88, past the pH sensor 86, and then back to the post-filter main line 20 through the pH return line 90. The electrical connections between the pH monitoring system 83 and the pH controller 80 are not shown.

The solenoid 124 shuts off treated irrigation water 111 flow from the post-filter main line 20 through the starting end 120 of the pH feed line 88 when the water-flow pressure seen at the pre-filter main-line pressure sensor 130 and/or at the mixing-chamber feed-line flow sensor 102 drop below pre-determined threshold values. The solenoid 124 is in electrical connection (not shown) with the master controller 78.

Figure 4:
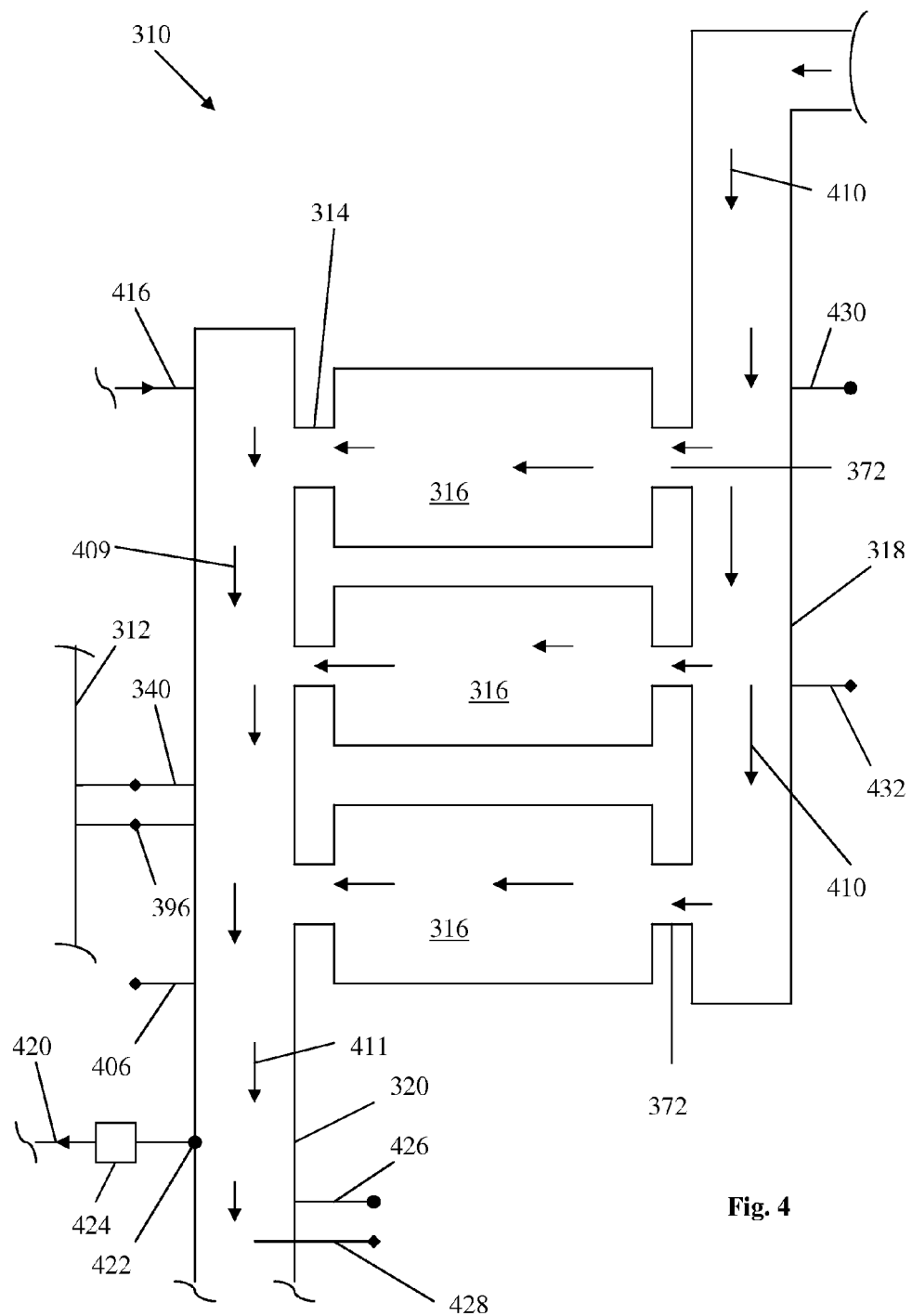
FIG. 4 is an at least partially diagrammatic view of a section of a system used in certain embodiments of the present invention.

The System of FIG. 4

Referring to FIG. 4, there is shown a segment of a system of the present invention designated by the general reference numeral 310, which differs from the system 10 of FIG. 1 to FIG. 3 by the omission of a separate mixing chamber component such as the mixing chamber 14 of the embodiment shown in FIG. 1 to FIG. 3. In the system 310 of FIG. 4, the material feed lines 340 (only two shown for simplicity) feed directly into a main line (as shown, into the main line segment that is the post-filter main line 320.

The system 310 includes a control unit 312 (partially shown in FIG. 4), a plurality of filters 316, an irrigation-water line or main line (which is designated in two segments, namely a pre-filter main line 318 and a post-filter main line 320) and filters 316 along the main line between its pre-filter segment (pre-filter main line 318) and its post-filter segment (post-filter main line 320). Components of system 310 that are not shown in FIG. 4 include the components within the control unit 312, namely a lower chamber which houses a feed-line feed pump, pH monitoring-system pump, a pH sensor, a pH feed line and a pH return line, and also an upper chamber which houses a flow controller, a master controller, a pH controller and a temperature controller. Other components of system 310 that are not shown in FIG. 4 include at least one storage container (one for the potassium-nutrient feedstock, although this system 310 could just as well have more storage containers to hold other materials as discussed above for system 10 of FIG. 1 through FIG. 3). In each instance the components of system 310 that are not shown in FIG. 4, and their electrical connections, are analogous to those described above for the system 10 shown in FIG. 1 to FIG. 3, and therefore no further description is needed here. Further, the components of system 310 that are shown in FIG. 4, and their electrical connections, also are analogous to those described above for the system 10 shown in FIG. 1 to FIG. 3, except as explicitly stated otherwise herein, and therefore little or no further description is needed here.

As mentioned above, there is a raw-material feed line 340 between the raw-material tank (not shown) and the post-filter main line 320. This raw-material feed line 340 runs through the interior of the control unit 312 and, as seen in FIG. 4, from there to the post-filter main line 320. For each of the materials, and raw-material feed lines 340, which for system 310 is at least one material and one raw-material feed line 340, there is an injection valve 396 along the raw-material feed line 340 just ahead of the point at which the feed line 340 enters, or discharges to, the post-filter main line 320.

Irrigation water flows to and through each of the filters 316 through filter feed lines 372, and discharges from each of the filters 316 to the post-filter main line 320. The materials also discharge to the post-filter main line 320 (via the feed lines 340) and along each of the material feed lines 340 upstream of the post-filter main line 320 is, as mentioned above, an injection valve 396, each of which is equipped with a backflow preventer (not shown).

In system 310, unlike the system 10 shown in FIG. 1 to FIG. 3, not only is there no separate mixing chamber component, there is no mixing-chamber feed line, no optional booster pump, no mixing-chamber feed-line flow meter, no mixing-chamber feed-line flow sensor, no mixing-chamber feed-line shut-off valve, no mixing-chamber discharge line and no mixing chamber discharge-line shut-off valve. There is a component that is the functional equivalent of the mixing-chamber discharge-line thermocouple 106, and that is a post-filter main-line thermocouple 406 that is positioned along the post-filter main line 320 downstream of the points at which the feed lines 340 discharge to the post-filter main line 320. The post-filter main-line thermocouple 406 ("thermocouple 406"), like the mixing-chamber discharge-line thermocouple 106 of system 10, monitors the irrigation-water temperature in the water stream to which the feedstock is charged.

The pre-filter segment of the main line (pre-filter main line 318) is open to each of the filters 316 through filter feed lines 372 or openings. Untreated irrigation water, that is, irrigation water that is not yet treated by the method of the present invention, which is shown by flow arrows and is designated as untreated irrigation water 410 in FIG. 4, flows through the pre-filter main line 318 and discharges to the filters 316 through the respective filter feed lines 372. In addition, each of the filters 316 is open to, and discharges to, the post-filter main line 320 via filter discharge lines 314 or openings. The untreated irrigation water 410 thus flows through the filters 316 and thereafter receives the charge of materials from their feed lines 340, becoming treated irrigation water that carries or has been treated with the potassium-nutrient feedstock of the present invention. Although charging the potassium-nutrient feedstock along a post-filter section of the main line (post-filter main line 320) is preferred, charging the potassium-nutrient feedstock along a pre-filter section of the main line (pre-filter main line 318) is not excluded from the present invention. The potassium-nutrient feedstock charge should, however, be pre-delivery (upstream of the point(s) of delivering the irrigation water to the crop). Such irrigation water is shown by flow arrows and is designated as treated irrigation water 411 in FIG. 4 and elsewhere herein.

Along the post-filter main line 320, in the order of from upstream (where the stream of irrigation water has not flowed past the feed lines 340 and therefore the water is filtered but not yet irrigation water 409) to downstream (farthest along the post-filter main line 320), are a post-filter main-line pressure gauge 426 and a post-filter main-line flow sensor 428.

Along the pre-filter main line 318, in the order of from upstream (closest to the water source, not shown) to downstream, are a pre-filter main-line pressure sensor 430 and a pre-filter main-line pressure gauge 432.

The temperature controller (not shown) within the control unit 312 is in electrical connection (not shown) with the thermocouple 406 along the post-filter main line 320. (The construction and operation of these electrical connections are well within the skill of an ordinary person skilled in the art.) The materials from the various storage tanks (not shown) are routed through the respective material feed lines 340 and charged to the post-filter main line 320 as the potassium-nutrient feedstock of the present invention. The potassium-nutrient feedstock intermixes with any other material being fed and with the relatively large stream of filtered irrigation water 409 flowing out from the filters 316. The treated irrigation water is preferably monitored by the thermocouple 406 downstream of the points at which the feed lines 340 discharge the materials to the post-filter main line 320. If that temperature is undesirably high, for instance 40° C. or higher (higher than 39° C.), the temperature controller (not shown) sends a feedback signal to the master controller (not shown) and the master controller shuts off the feed pumps (not shown) until a safe temperature is seen at the thermocouple 406, and this off/on sequence is repeated until a safe temperature, as seen at the thermocouple 406, is maintained. The volume and flow of irrigation water 409 in the post-filter main line 320 are, however, far greater than that through the mixing chamber 14 of system 10 shown in FIG. 1 to FIG. 3, and therefore the likelihood of an excessively high temperature being seen at the thermocouple 406 approaches negligible, regardless of the concentration of materials which are being fed, outside of, of course, a major water-flow problem in the irrigation system itself.

The master controller (not shown) automatically turns the system 310 on. The master controller is electrically connected (not shown) to the pre-filter main-line pressure sensor 430. (The construction and operation of these electrical connections are well within the skill of an ordinary person skilled in the art.) When a minimum pressure (typically 15 psi) is seen at the pre-filter main-line pressure sensor 430, the master controller actuates the feed pumps (not shown) and injection valves 396 and any other component of the system 310 which facilitate the treatment of the irrigation water that are then in an inactive state. Upon such actuation, the potassium-nutrient feedstock of the present invention starts feeding to the post-filter main line 320. The master controller will not allow such actuation unless the minimum is met. Once the feed pumps (not shown) and injection valves 396 are actuated, the master controller, for safety reasons and preferably, will automatically shut down the feed pumps and injection valves 396 when the value seen at the pre-filter main-line pressure sensor 430 falls below its minimum, and automatically restart the feed pumps and injection valves 396 when the value seen at the pre-filter main-line pressure sensor 430 meets or exceeds its respective minimum. In other words, once the flow of untreated irrigation water 410 to the fields begins, the irrigation water starts flowing (a) through the pre-filter main line 318, (b) to and through the filters 316, (c) discharging to, and flowing through the post-filter main line 320, and (d) from there to the irrigation lines in the field(s) (not shown), and when this flow starts, the master controller will actuate the feed pumps and injection valves 396 provided this irrigation water flow is at the normal, or expected, pressure, flow and flow rate. Note that generally the flow of irrigation will occur as described above regardless of whether the master controller has actuated the feed pumps and injection valves 396 or has shut down the feed pumps and injection valves 396 after initial actuation because that water flow sequence and infrastructure are the conventional elements of the irrigation system.

The starting end 420 of the pH feed line is downstream of the point(s) at which the materials are charged to the post-filter main line 320 and therefore, as in system 10 shown in FIG. 1 to FIG. 3, it is the pH of the treated irrigation water 411, not the irrigation water prior to treatment, which is being monitored by diverting a very small stream of treated irrigation water 411 through the starting end 420 of the pH feed line to the pH sensor (not shown) whereby the pH controller (not shown) adjusts (increases or decreases) the feed of acid(s) and/or base(s) to achieve a constant target treated irrigation water pH. The target treated irrigation water pH is typically a pH of about 6.5. Along the post-filter main line 320, in the order of from upstream (where the stream of irrigation water has not flowed past the feed lines 340 and therefore the water is filtered but not yet irrigation water 409) to downstream (farthest along the post-filter main line 320), are the terminal end 416 of the pH return line, the material feed lines 340 and the thermocouple 406 (both mentioned above), the starting end 420 of the pH feed line (along which is a pH line shut-off valve 422 and a solenoid 424), a post-filter main-line pressure gauge 426 and a post-filter main-line flow sensor 428 (both mentioned above).

Again, the remainder of the system 310 is analogous to the system 10 shown in FIG. 1 to FIG. 3 and described in detail above. Further, as described above for system 310, the "mixing chamber" concept is part of, or within, the irrigation main line, namely the post-filter section of the irrigation main line (post-filter main line 320). The dilution of the potassium-nutrient feedstock in this far greater water stream is of course highly increased. Further, system 310 is simpler than system 10 because most of the controls associated with a separate mixing chamber component such as the mixing chamber 14 of system 10 are eliminated, as described above.

Demonstrative Example 1

The method of the present invention was assessed for use at a 150 acre almond ranch which will normally receive a total of four acre-feet of irrigation water over its eight-month (March 1 to October 31) growing season, delivered as follows: (a) 1.0 acre-foot during the first three months (March 1 through June 1); 2.5 acre-feet during the second three months (June 1 through September 1); and 0.5 acre-foot during the last two months (September 1 through November 1). The source of potassium is a potassium-nutrient feedstock of the present invention, which in this instance is a 75 wt. % aqueous solution of potassium formate (a nonconventional 0-0-42 NPK fertilizer), continuously added with the irrigation water in the amount of 50 lb/acre potassium (as K2O) over the March, April and May three-month time interval period, 25 lb/acre over the June, July and August three-month time period, and 50 lb/acre over the September and October two-month time period. In addition to delivering 125 lb./acre potassium (as K2O) during the crop cycle, this prolonged-term continuous irrigation delivers 119 lb./acre of organic formate and no yield-extraneous material.

Demonstrative Comparative Example A

In comparison to Example 1, if the source of potassium used is potassium thiosulfate (K2S2O3) fed to the irrigation system as a 25 wt. percent aqueous solution (a conventional 0-0-25 NPK fertilizer), the soil receives no organic material, the soil receives yield-extraneous material, and the weight and volume of the potassium source are multiples of the potassium-nutrient feedstock of Example 1 which seriously escalates shipping, storage and handling costs and convenience.

Demonstrative Comparative Example B

In comparison to Example 1, if the source of potassium used is potassium sulfate (K2SO4) fed to the irrigation system as an 8 wt. percent aqueous solution (a conventional 0-0-8 NPK fertilizer), the soil receives no organic material, the soil receives yield-extraneous material, and the weight and volume of the potassium source are multiples of the potassium-nutrient feedstock of Example 1 which seriously escalates shipping, storage and handling costs and convenience.

While the foregoing written description of the invention enables one of ordinary skill in the art to make and use the invention, and to make and use what is presently considered the best mode of the invention, those of ordinary skill in the art will understand and appreciate the existence of variations, combinations and equivalents of the specific embodiments, methods and examples provided herein. The present invention should not be limited by the above described embodiments, methods and examples.

We claim:

1. A method of prolonged-termed emitter-irrigation potassium fertigation of an agricultural field, said agricultural field being irrigated by means of an active emitter-irrigation system having a stream of flowing irrigation water upstream of said agricultural field, said method comprising the steps of:

(step 1) converting said irrigation water to treated irrigation water by continuously charging a potassium-nutrient feedstock to said stream of said flowing irrigation water upstream of said agricultural field whereby said irrigation water is converted to treated irrigation water,
wherein said potassium-nutrient feedstock is comprised of potassium formate and water;
(step 2) irrigating said agricultural field with said treated irrigation water; and
(step 3) repeating step 1 and step 2 each irrigation day over a prolonged term.

2. The method of prolonged-termed emitter-irrigation potassium fertigation of an agricultural field according to claim 1 wherein said potassium-nutrient feedstock is a 50 to 75 wt. percent aqueous solution of potassium formate.

3. The method of prolonged-termed emitter-irrigation potassium fertigation of an agricultural field according to claim 1 wherein said potassium-nutrient feedstock is a 65 to 75 wt. percent aqueous solution of potassium formate.

4. The method of prolonged-termed emitter-irrigation potassium fertigation of an agricultural field according to claim 1 wherein said emitter-irrigation system is a micro-irrigation system.

5. The method of prolonged-termed emitter-irrigation potassium fertigation of an agricultural field according to claim 1 wherein said emitter-irrigation system is an overhead sprinkler system.

6. The method of prolonged-termed emitter-irrigation potassium fertigation of an agricultural field according to claim 1 wherein, in step 3, said prolonged term is from 50 to 100 percent of said crop cycle.

7. The method of prolonged-termed emitter-irrigation potassium fertigation of an agricultural field according to claim 1 wherein, in step 3, said prolonged term is from 75 to 100 percent of said crop cycle.

8. The method of prolonged-termed emitter-irrigation potassium fertigation of an agricultural field according to claim 1 wherein, in step 3, said prolonged term is from 90 to 100 percent of said crop cycle.

9. The method of prolonged-termed emitter-irrigation potassium fertigation of an agricultural field according to claim 1 wherein, in step 3, said prolonged term is a three month time period during said crop cycle.

10. The method of prolonged-termed emitter-irrigation potassium fertigation of an agricultural field according to claim 1 wherein, in step 3, said prolonged term is a five month time period during said crop cycle.

11. The method of prolonged-termed emitter-irrigation potassium fertigation of an agricultural field according to claim 1 wherein, in step 1, said continuously charging of said potassium-nutrient feedstock provides a concentration of from 1 to 200 ppm of potassium as K2O in said treated irrigation water.

12. The method of prolonged-termed emitter-irrigation potassium fertigation of an agricultural field according to claim 1 wherein, in step 1, said continuously charging of said potassium-nutrient feedstock provides a concentration of from 5 to 100 ppm of potassium as K2O in said treated irrigation water.

13. The method of prolonged-termed emitter-irrigation potassium fertigation of an agricultural field according to claim 1 wherein said active agricultural emitter-irrigation system includes a main line and a side-arm mixing chamber off said main line, and said stream of flowing irrigation water is flowing through said side-arm mixing chamber and discharging to said main line, and
wherein, in step 1, said continuously charging of said potassium-nutrient feedstock to said stream of said flowing irrigation water upstream of said agricultural field is a continuously charging of said potassium-nutrient feedstock to side-arm mixing chamber.

* * * * *